United States Patent [19]

Mittag

[11] Patent Number: 5,090,651
[45] Date of Patent: Feb. 25, 1992

[54] GAS CURTAIN ADDITIVES AND ZONED TUNNEL FOR SOLDERING

[75] Inventor: Michael T. Mittag, New Haven, Vt.

[73] Assignee: Electrovert Ltd., Toronto, Canada

[21] Appl. No.: 733,061

[22] Filed: Jul. 17, 1991

Related U.S. Application Data

[63] Continuation of Ser. No. 472,899, Jan. 31, 1990, abandoned.

[51] Int. Cl.[5] .................. B23K 1/04; B23K 35/38; F27D 7/00
[52] U.S. Cl. ..................... 228/219; 228/42; 432/64; 110/179; 219/388
[58] Field of Search ............... 432/64; 110/179; 228/180.1, 219, 220, 240, 42; 219/388

[56] References Cited

U.S. PATENT DOCUMENTS

| | | | |
|---|---|---|---|
| 3,921,888 | 11/1975 | Elliott et al. | 228/180 |
| 4,538,757 | 9/1985 | Bertiger | 228/180.1 |
| 4,606,493 | 8/1986 | Christoph et al. | 228/180.1 |
| 4,684,056 | 8/1987 | Deambrosio | 228/180.1 |
| 4,696,226 | 9/1987 | Witmer | 432/64 |
| 4,726,506 | 2/1988 | Kondo | 228/180.1 |
| 4,811,893 | 3/1989 | Kanahara et al. | 228/198 |
| 4,848,640 | 7/1989 | Gieskes | 228/37 |
| 4,848,642 | 7/1989 | Kondo | 228/37 |
| 4,898,319 | 2/1990 | Williams | 228/219 |

FOREIGN PATENT DOCUMENTS

| | | |
|---|---|---|
| 3309648 | 9/1983 | Fed. Rep. of Germany . |
| 8520254 | 12/1985 | Fed. Rep. of Germany . |
| 3737563 | 5/1989 | Fed. Rep. of Germany . |
| 0002277 | 1/1977 | Japan .................. 228/220 |
| 2027062 | 2/1980 | United Kingdom ......... 228/219 |

OTHER PUBLICATIONS

Lotsystem Mit Schutzgaslotzone, Hartmann et al.

Primary Examiner—Samuel M. Heinrich
Attorney, Agent, or Firm—Darby & Darby

[57] ABSTRACT

A tunnel enclosure has a fluid barrier curtain at an entry and an exit and provides an apparatus for soldering an element. The fluid barrier curtains permit an additive, such as a soldering aid or the like to be included with the fluid at the curtain. More than one zone permits different temperatures or gas atmospheres and elements are passed from zone to zone with fluid barrier curtains between. A process for soldering comprises conveying an element into an enclosed zone through an entry containing at least one fluid barrier curtain, with an additive added to fluid in the curtain, heating and soldering the element in the zone, and conveying the element from the enclosed zone through an exit containing at least one fluid barrier curtain.

29 Claims, 1 Drawing Sheet

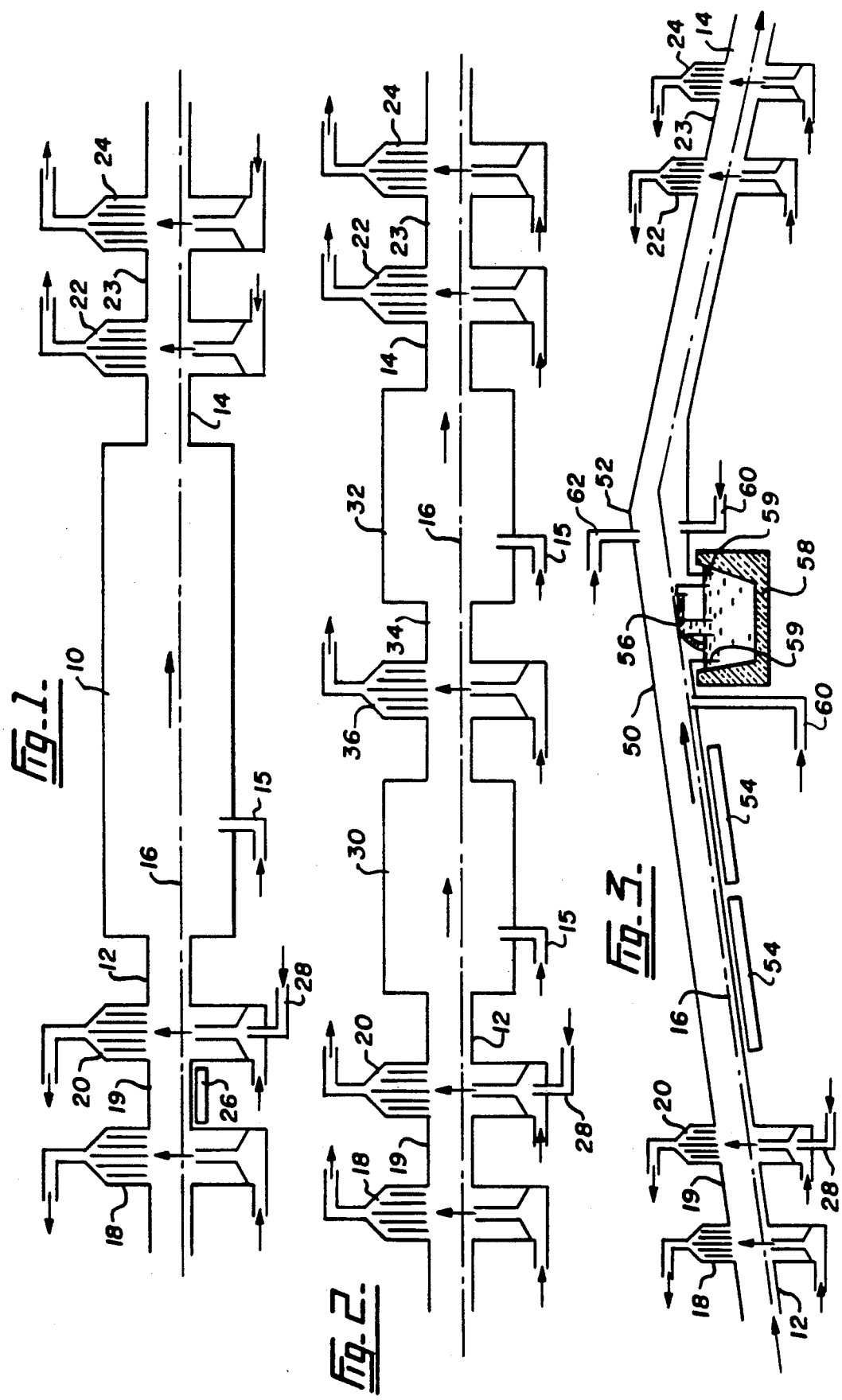

GAS CURTAIN ADDITIVES AND ZONED TUNNEL FOR SOLDERING

This is a continuation of application Ser. No. 07/472,899, filed Jan. 31, 1990, now abandoned.

TECHNICAL FIELD

The present invention relates to soldering, and more specifically to soldering within an enclosed zone.

BACKGROUND ART

In the past, soldering has generally required flux to promote wetting and good solder joints. Flux removes surface oxides on the metallic surfaces to be soldered. When elements, such as printed wiring boards and the like are soldered, they are generally fluxed prior to soldering. More recently, inert gas soldering, generally nitrogen gas, in some cases may also be mixed with other types of gas, have been used to replace fluxes. By eliminating flux and still preventing oxidation of the solder, one avoids the necessity of cleaning the solder joints after soldering. Reducing agents and other soldering additions, in gaseous form, liquid droplets or mist, or in some cases in powder form, are sometimes applied even in fluxless soldering.

In one embodiment, soldering is achieved by passing an element through a solder wave. In another embodiment reflow soldering is used wherein solder paste is first applied to the metallic components to be soldered, and the element is then heated so that the solder melts to liquid solder which wets and forms the solder joint. Most solder paste used for reflow soldering includes flux. However if reflow soldering occurs in an inert atmosphere, then a reduction of the quantity of flux in the solder paste can be achieved.

In our co-pending application filed Dec. 6, 1989 entitled Tunnel for Fluxless Soldering, Ser. No. 448,008 is disclosed soldering of elements, such as printed wiring boards in a non-explosive gas atmosphere which substantially excludes oxygen. Disclosure of this application is incorporated herein by reference.

The tunnel enclosure disclosed in our co-pending application is provided with entry gas curtains and exit gas curtains at the entry and exit to the tunnel. These gas curtains may be of the type shown in U.S. Pat. No. 4,696,226 to Witmer and provide two sets of curtains at both the entry and exit with a space between, which is sufficient to permit the element to be soldered to pass completely through the first curtain without interrupting the flow of fluid at the second curtain. When the element passes through the second curtain, then the flow of fluid to the first curtain is not interrupted. In this way, one of the gas curtains is always closed ensuring that no gas within the enclosure escapes out of the tunnel enclosure and no air from outside enters the enclosure.

It is an aim of the present invention to provide at least one enclosed zone for soldering which has at least one fluid barrier curtain at both the entry and the exit and permits the addition of air additive such as a soldering aid, to be introduced into the enclosed zone by means of the fluid barrier curtain. It is a further aim to provide multiple enclosed zones with fluid barrier curtains between zones wherein the zones can be at different temperatures, contain different gases or percentages of gas combinations, or have different ambient conditions.

DISCLOSURE OF INVENTION

The present invention provides a process for soldering an element comprising the steps of conveying the element into an enclosed zone through an entry containing at least one fluid barrier curtain, with an additive added to fluid in the curtain, heating and soldering the element in the zone, and conveying the element from the enclosed zone through an exit containing at least one fluid barrier curtain.

In another embodiment there is provided a process for soldering an element comprising the steps of conveying the element into a first enclosed zone through an entry containing at least one fluid barrier curtain, heating the element in the first zone, conveying the element from the first zone through an aperture containing at least one fluid barrier curtain into a second enclosed zone, soldering the element in the second zone, and conveying the element from the second zone through an exit containing at least one fluid barrier curtain.

The present invention also provides an apparatus for soldering an element comprising an enclosed zone containing a gas atmosphere, the enclosed zone having an entry and an exit, at least one fluid barrier curtain at the entry with means to add an additive to fluid in the curtain, at least one fluid barrier curtain at the exit, conveyor means for conveying an element through the fluid barrier curtain at the entry, the enclosed zone and the fluid barrier curtain at the exit, and means to heat and solder the element within the enclosed zone.

In a still further embodiment, there is provided an apparatus for soldering an element comprising a first enclosed zone for containing a gas atmosphere, the first enclosed zone having an entry and an exit, a second enclosed zone for containing a gas atmosphere, the second enclosed zone having an entry and an exit, at least one fluid barrier curtain at the entry of the first zone, at least one fluid barrier curtain between the exit of the first zone and the entry of the second zone, at least one fluid barrier curtain at the exit of the second zone, conveyor means for conveying the element through the fluid barrier curtain and the first and second zone, and means to heat and solder the element within the first and second zones.

BRIEF DESCRIPTION OF DRAWINGS

In drawings which illustrate embodiments of the invention,

FIG. 1 is a side elevational view showing an enclosed zone with fluid barrier curtains at entry and exit.

FIG. 2 is a side elevational view showing two enclosed zones with a fluid barrier curtain between the zones.

FIG. 3 is a side elevational view showing an apex shaped zone with a solder wave arrangement therein and fluid barrier curtains at the entry and exit.

BEST MODE OF CARRYING OUT THE INVENTION

Referring now to FIG. 1, there is provided a linear enclosed zone 10 with an entry tunnel 12 and an exit tunnel 14. A gas entry 15 provides gas within the zone 10. A conveyor 16, shown in dotted line, conveys elements into the entry tunnel 12 through the zone 10 and out through the exit tunnel 14. A first fluid barrier curtain 18 and a second fluid barrier curtain 20 are shown in line in the entry tunnel 12 with a tunnel portion 19 in between, and a first fluid barrier curtain 22 and a second fluid barrier curtain 24 are shown in line in the exit tunnel 14 with a tunnel portion 23 in between. The fluid barrier curtains are of the same type as that shown in U.S. Pat. No. 4,696,226. The fluid barrier curtains remove excess gas from within the enclosed zone.

The conveyor may be a single conveyor passing from the entry tunnel 12 to the exit tunnel 14 or alternatively may be one or more of a number of conveyors such as a mesh belt conveyor, finger conveyor to support elements to be soldered, such as circuit boards and the like, or a pallet type conveyor to support circuit boards and other types of elements to be soldered on pallets.

The first and second fluid barrier curtains 18 and 20 are spaced apart at sufficient distance so that when an element interrupts the flow of air in one curtain barrier, it does not extend across the second curtain barrier, thus there is always one curtain barrier in full operation. In this way, the atmosphere within the enclosed zone 10 remains within that zone and does not escape out to the atmosphere. Similarly, atmospheric air cannot enter the enclosed zone 10.

In one embodiment, a heater 26 is provided adjacent the tunnel portion 19 to preheat the elements passing in the tunnel portion 19 between the fluid barrier curtains 18 and 20.

An additive, in one embodiment a soldering additive is added at either the first entry fluid barrier curtain 18 or the second entry fluid barrier curtain 20 to the gas flow in the curtain. If the additive is a dangerous substance, such as formic acid, it is added at the second curtain 20. The additives may be introduced to the curtain in different manners, as for instance a mixture of curtain gases or alternatively liquids entrained within the curtain gas. An injector nozzle 28 is shown in the fluid barrier curtain 20 to inject an additive directly into the fluid of the barrier 20. The nozzle 28 may be a spray nozzle, a spray bar or the like. The fluids may comprise heated nitrogen, various reducing agents, adipic acid, gases or mist mixed with fluid at the curtains or premixed. Gas may be provided from bottled sources or a gas reservoir. The solder additives may be a flux when some oxygen is present in the enclosure. If no oxygen is present, flux may not be needed.

The additives can be obtained from a sealed vessel and entrained, sprayed, atomized or the like directly into the gas supply forming the gas curtain. The additive source may be located remotely from the gas supply or the gas curtain, and may be piped from a central location for a number of units and premixed with gas or gases so that the additive has insured proportional control of the mixture in the curtain. In another embodiment the curtain gas is preheated to a selected temperature. This may be used for preheating the element prior to entering the enclosed zone 10. By preheating the element, one avoids thermal shock which can occur in some instances during the soldering step. Furthermore, the additive may be thermally activated within the enclosed zone.

In one embodiment a formic acid additive is present in the enclosure 10 and assists in eliminating and preventing oxides that may be present on solder exposed to the enclosure 10. In another embodiment adipic acid additive or other acidic compounds, in powder or liquid form, are added by means of the fluid in the curtain. In some circumstances, the adipic acid additive enhances capillary rise of solder in holes requiring soldering in elements.

The soldering may be wave soldering, as will be described here afterwards, or alternatively, reflow soldering, wherein solder paste is applied to metallic pads or components on the element to be soldered. Preplated or presoldered bumps may be provided on pads or components of an element which melt and reflow when the element is heated. Heaters (not shown) are provided adjacent to or within the enclosure 10 and the elements are heated. As they are heated the solder paste melts. The solder then flows to form a solder joint and subsequently cools so that the solder solidifies before leaving the exit tunnel 14. No flux is required in the solder paste if the atmosphere in the enclosure 10 excludes oxygen and/or includes a gaseous reducing agent which provides fluxing action. Preplated or presoldered bumps do not require flux for reflow soldering in such an atmosphere.

FIG. 2 illustrates another embodiment wherein a first enclosed zone 30 and a second enclosed zone 32 are provided in line. Between the first zone 30 and the second zone 32 is an intermediate tunnel 34 with an intermediate fluid barrier curtain 36. The conveyor 16 conveys elements from the entry 12 to the exit 14 through both zones 30 and 32. In this embodiment the first zone may preheat the elements and may be at a different temperature than the second zone 32. Soldering may occur in the second zone 32 which is at a different temperature. By heating the element up in different zones, thermal shock is reduced. Thermal profiling of the element from zone to zone may be provided for elements requiring this type of heating. The intermediate fluid barrier curtain 36 separates the two zones 30 and 32. In another embodiment different gases may be provided within the two zones 30 and 32 and the intermediate curtain 36 isolates the two zones from each other. A plurality of zones maybe provided with gas curtains there between to provide a series of controlled atmospheres with different environments and/or temperatures. This arrangement provides selected heat profiles for a soldering process. Furthermore, the gas curtains prevent the escape of gas from one zone into another. Undesired aromatic gases may be contained by utilizing this system, and furthermore, the curtains may be used to add various soldering additives, such as reducing agents, to the elements passing through the curtains. In some curtains, as shown in the drawings, the fluid in the curtain moves upwards from an aperture in the base to a receiver at the top. In situations where it is required to apply an additive to the top of an element, the fluid flow in the curtain is measured. By preheating the gas in the different curtains with selected temperature, a thermal profile can be provided for the element. Exterior heaters may be provided for different zones. The curtains may be of varying widths for the preheating of the elements.

The enclosed zone 10 shown in FIG. 1 and zones 30 and 32 shown in FIG. 2 represent linear tunnels, however, FIG. 3 indicates an apex shaped tunnel 50 with a peak 52 or apex above the level of the entry 12 and exit 14. A conveyor 16 is shown for conveying elements through the curtains 18 and 20 over preheaters 54 to preheat the elements and then through a solder wave 56 positioned above a solder pot 58. The enclosure 50 has skirts 59 which extend down into the solder in the solder pot 58. Thus, a seal is provided between the solder pot and the enclosure 50. For maintenance purposes the solder pot 58 may be lowered and then raised to the position shown in FIG. 3. Gas entry lines 60 are shown on each side of the solder pot 58 into the enclosure 50 and a further gas line 62 is shown above the solder pot 58.

In another embodiment, additional curtains may be provided at either one side or both sides of the solder pot adjacent the solder pot, thus isolating the heating zone from the solder zone and the solder zone from the cooling zone.

Various changes may be made to the embodiments shown herein without departing from the scope of the present invention which is limited only by the following claims.

The embodiments of the present invention in which an exclusive property or privilege is claimed are defined as follows:

1. A process for soldering an element comprising the steps of:
   conveying the element into an enclosed zone through an entry containing at least one fluid barrier curtain, with an additive added directly into fluid in the curtain so that the element is treated with the additive upon entry into the zone;
   then heating and soldering the element in the zone, and
   conveying the soldered element from the enclosed zone through an exit containing at least one fluid barrier curtain.

2. The process for soldering according to claim 1 wherein two fluid barrier curtains are provided in line in the entry and in the exit, and wherein the additive is added at the second of the two curtains in the entry.

3. The process for soldering according to claim 2 wherein the additive is selected from the group consisting of flux, reducing agents, formic acid, adipic acid, gas mixed with fluid in the second of the two curtains, and mist mixed with fluid in the second of the two curtains.

4. The process for soldering according to claim 1 wherein two fluid barrier curtains are provided in line in the entry and in the exit, and wherein the additive is added at the first of the two curtains in the entry.

5. The process for soldering according to claim 4 wherein the additive is selected from the group comprising flux, reducing agent, gas mixed with fluid in the first of the two curtains and mist mixed with fluid in the first of the two curtains.

6. The process for soldering according to claim 1 wherein fluid in the fluid barrier curtain at the entry is a preheated gas.

7. The process for soldering according to claim 1 wherein the element is conveyed in a predetermined path in the enclosed zone, a solder wave is formed above a solder pot beneath the path so that at least a portion of the element conveyed in the path passes through the solder wave.

8. The process for soldering according to claim 1 wherein the soldering is reflow soldering within the enclosed zone.

9. A process for soldering an element comprising the steps of:
   conveying the element into a first enclosed zone through an entry containing at least one fluid barrier curtain;
   heating the element in the first zone;
   conveying the element from the first zone through an aperture containing at least one fluid barrier curtain into a second enclosed zone;
   soldering the element in the second zone, and
   conveying the element from the second zone through an exit containing at least one fluid barrier curtain, wherein an additive is added directly into fluid in at least one of the curtains so that the element is treated with the additive upon entry into at least one of the first and second enclosed zones.

10. The process for soldering according to claim 9 wherein the first zone and the second zone are at different temperatures.

11. The process for soldering according to claim 9 including additional enclosed zones with apertures containing fluid barrier curtains therein, and wherein the element is conveyed through all the zones and fluid barrier curtains.

12. The process for soldering according to claim 9 wherein two fluid barrier curtains in line are provided in the entry and in the exit, and wherein an additive is added to fluid at the second of the two curtains in the entry to at least one of the zones.

13. A process for soldering an element comprising the steps of:
   conveying the element into a first enclosed zone through an entry containing at least one fluid barrier curtain;
   heating the element in the first zone;
   conveying the element from the first zone through an aperture containing at least one fluid barrier curtain into a second enclosed zone;
   soldering the element in the second zone;
   conveying the element from the second zone through an exit containing at least one fluid barrier, wherein the first zone and the second zone have different gas atmospheres therein.

14. An apparatus for soldering an element comprising:
   an enclosed zone for containing a gas atmosphere, the enclosed zone having an entry and an exit;
   at least one fluid barrier curtain at the entry with means for adding an additive directly into fluid in the curtain so that the element is treated with the additive upon entry into the enclosed zone;
   at least one fluid barrier curtain at the exit;
   conveyor means for conveying an element through the fluid barrier curtain at the entry, the enclosed zone and the fluid barrier curtain at the exit, and
   means for heating and soldering the element within the enclosed zone.

15. The apparatus for soldering an element according to claim 14, wherein two fluid barrier curtains in line are provided at the entry, and wherein the means for adding adds additive directly into the second curtain.

16. The apparatus for soldering an element according to claim 14, wherein two fluid barrier curtains in line are provided at the entry, and wherein the means for adding adds additive directly into the first curtain.

17. The apparatus for soldering an element according to claim 14 including at least one heater means in the zone to heat the element conveyed on the conveyor means, means for forming at least one solder wave in the zone after the heater means, the conveyor means conveying the element in a predetermined path through the enclosed zone, ensuring at least a portion of the element passes through the solder wave.

18. The apparatus for soldering an element according to claim 17 including at least one fluid barrier curtain positioned on each side of the means for forming the solder wave to divide up the enclosed zone into isolated portions.

19. The apparatus for soldering an element according to claim 14 wherein the means to solder includes reflow soldering.

20. The apparatus for soldering an element according to claim 14 wherein the enclosed zone comprises a linear tunnel.

21. The apparatus for soldering an element according to claim 17 wherein the enclosed zone is an apex shaped tunnel and wherein the solder wave is formed adjacent an apex of the tunnel.

22. The apparatus for soldering an element according to claim 14 wherein the conveyor means are selected from the group consisting of belt conveyors, finger type conveyors and pallet type conveyors.

23. An apparatus for soldering an element comprising:
- a first enclosed zone for containing a gas atmosphere, the first enclosed zone having an entry and an exit;
- a second enclosed zone for containing a gas atmosphere, the second enclosed zone having an entry and an exit;
- at least one fluid barrier curtain at the entry of the first zone;
- at least one fluid barrier curtain between the exit of the first zone and the entry of the second zone;
- at least one fluid barrier curtain at the exit of the second zone;
- conveyor means for conveying the element through the fluid barrier curtains and the first and second zones;
- means to heat and solder the element within the first and second zone, and wherein the first zone and the second zone have different gas atmospheres therein.

24. An apparatus for soldering an element comprising:
- a first enclosed zone for containing a gas atmosphere, the first enclosed zone having an entry and an exit;
- a second enclosed zone for containing a gas atmosphere, the second enclosed zone having an entry and an exit;
- at least one fluid barrier curtain at the entry of the first zone;
- at least one fluid barrier curtain between the exit of the first zone and the entry of the second zone;
- means for adding an additive directly into fluid in at least one of the curtains so that the element is treated with the additive upon entry into at least one of the first and second zones;
- conveyor means for conveying the element through the fluid barrier curtains and the first and second zones, and
- means for heating and soldering to heat and solder the element within the first and second zones.

25. The apparatus for soldering an element according to claim 24 including at least one additional zone through which the conveyor means conveys the element, the additional zone having at least one fluid barrier curtain at an entry and an exit.

26. The apparatus for soldering an element according to claim 24 wherein the element is heated in the first zone and soldered in the second zone.

27. The apparatus for soldering an element according to claim 24 wherein the first zone and the second zone are at different temperatures.

28. The apparatus for soldering an element according to claim 24 wherein two fluid barrier curtains are provided in line at the entry of the first zone and between the exit of the first zone and the entry of the second zone, and wherein the additive is added to fluid at least one of the second curtains.

29. The apparatus for soldering an element according to claim 24 wherein two fluid barrier curtains in line are provided at the exit of the first zone and the entry of the second zone, and wherein the additive is added to fluid at at least one of the first curtains.

* * * * *